Patented May 10, 1938

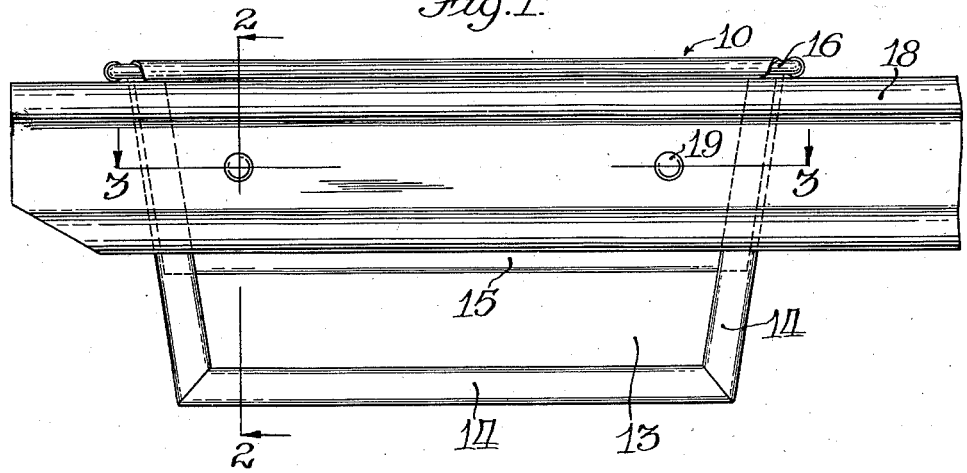
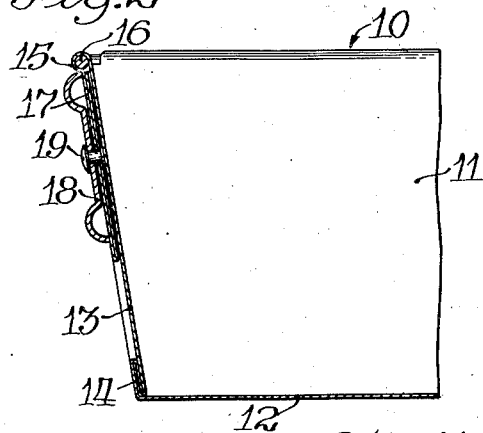
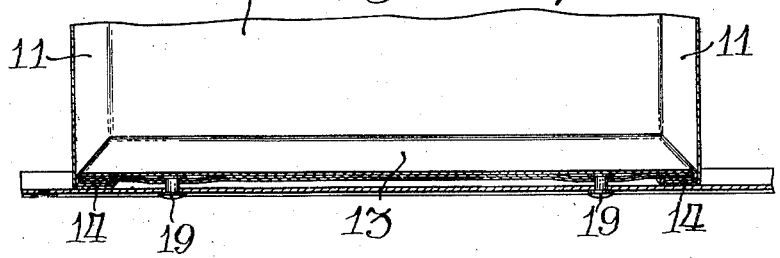

2,116,975

UNITED STATES PATENT OFFICE 2,116,975

BAKING PAN SET CONSTRUCTION

Jacob Kollman, Chicago, Ill., assignor to The Edward Katzinger Company, Chicago, Ill., a corporation of Illinois Application February 11, 1937, Serial No. 125,226

9 Claims. (Cl. 53—6)

This invention relates to baking pan sets embodying a plurality of baking pans secured together in spaced relative positions as a set by a frame or a series of straps lying flush against the exposed walls of said pans and has for its object the firm and rigid mounting on and securing to the pans of the set of the frame or straps by which they are held in their fixed relative positions.

Among its other objects the present invention contemplates the mounting and securing of the straps or frame to the end walls of the pan so that the end walls of the pans are unbroken and are not pierced by rivets or any other elements but on the contrary are smooth, solid and uninterrupted.

Furthermore, the present invention has in view a construction wherein the straps are not only secured to the end walls of the pans of the set but to the end edges of the side walls of the pans whereby the straps or frame are incapable of being bent or moved away from cooperation and contact with the end walls of the pans of the set.

With the above and other objects in view, as will be apparent, this invention consists in the construction, combination and arrangement of parts all as hereinafter more fully described, claimed and illustrated in the accompanying drawing, wherein:

Fig. 1 is a fragmentary end elevation of a pan set constructed in accordance with the present invention;

Fig. 2 is a vertical section taken along line 2—2 of Fig. 1 through the end wall and cooperating strap on one of the pans of the set; and Fig. 3 is a horizontal section taken along line 3—3 of Fig. 1.

Heretofore, in the construction of pan sets the straps or frame whereby the pan sets are held in fixed relative positions in the set have been secured to the pans of the set in a number of ways. These prior art structures have never been adapted to three-piece pans, wherein the bottom and side walls of the individual pans are in one piece while the end walls thereof are separate therefrom but secured thereto. Furthermore, these prior sets have frequently had rivets piercing the end walls of the pans, been relatively insecure, and sometimes the straps or frame have pulled away from their operative positions against the end walls of the individual pans of the set.

The present invention contemplates a pan set structure particularly adaptable to three-piece pans, whereby the end walls of the pans are unbroken, the straps or frame are rigidly and firmly secured to the end walls of the individual pans and be incapable of pulling away from their operative positions against the end walls of the pans, and the pan units will each have a firm and permanent connection between the end walls and the end edges of the side walls thereof.

Reference being had more particularly to the drawing, 10 designates the individual pans of the set, each pan constituting the side walls 11, bottom 12 and the end walls 13. In the construction of the pans 10 shown in the present invention the end walls 13 are separate from the side walls 11 and bottom 12 which are constructed from a unitary sheet of metal. The end edges of the bottom 12 and the side walls 11 are interseamed, as at 14, with the side and bottom edges of the end walls 13 mounting the end walls 13 and permanently securing them to the bottom 12 and side walls 11, thereby forming a solid, substantial pan 10.

At the upper or top edges of the walls 11 and 13 of each independent pan 10 are the flanges 15 which may be bent outwardly, downwardly and inwardly to be wrapped about a wire frame 16 positioned against the outer surfaces of the walls 11 and 13 adjoining the flanges 15 whereby an outstanding bead is created at the edge of each pan wall.

An extension 17 is formed on each of the flanges 15 upon the end walls 13 and projects downwardly below the outstanding bead of such wall to rest flush against the outer face of the end wall 13. The extremities or side edges of this extension 17 are seamed into and engaged by the seams 14 which join the end edges of the side walls 11 to the side edges of the end walls 13.

The straps or frame 18 which lie against the end walls 13 of the pans 10 of the set overlie these extensions 17 of the flanges 15 of the end walls 13 and rivets 19 are passed through the straps or frame and the extension 17, whereby the heads of the rivets 19 are engaged and located between the outer surface of the wall 13 and the inner surface of the extension 17.

From the foregoing, it is manifest that the extensions 17 of the flanges 15 on the end walls 13 are rigidly and permanently secured to and in the seams 14 joining or connecting said end walls to the end edges of the side walls 11 of the pan 10, that the strap and frame 18 is substantially and fixedly secured to these extensions without piercing or interrupting the end walls 13 of the pan 10, and that any tendency the straps or frame 18 may have to become loosened or move away from the end walls 13 of the pans 10 is entirely overcome by the rigidity and firmness with which the said extensions 17 are locked or anchored to the seams 14.

What is claimed is:

1. The combination with a plurality of individual baking pans, of flanges at the edges of the walls thereof, a wire frame positioned adjacent the said flanges and encircled thereby, extensions on the flanges of the end walls of the pans, means for anchoring and securing the terminals of said extensions to the junction between the end walls and side walls of the pan, and a strap overlying said extensions secured thereto.

2. The combination with a plurality of independent baking pans, of seams joining the edges of the end walls of each pan to the extremities of the side walls thereof, flanges on said end walls, extensions on the said flanges lying flush against the end walls the extremities of which are engaged by the seams between the end walls and the side walls, a strap overlying said extensions, and means for securing said strap to the said extensions.

3. The combination with a plurality of baking pans, of seams joining the end walls of each pan to the extremities of the side walls thereof, flanges on the end walls of each pan bent outwardly and downwardly, extensions on said flanges lying flush against the outer surfaces of the walls, the extremities of said extensions being seamed and folded into the seams joining the side walls and end walls of the pan, and a strap overlying and secured to said extensions.

4. A baking pan comprising a bottom, angularly disposed side walls, independently formed end walls interposed between the ends of said side walls, strips integral with the top edges of the end walls of the pan and lying substantially flush against the outer faces of said end walls and having their end edges adjacent the end edges of said side walls, and means for joining the adjoining edges of the side walls and bottom to the adjoining edges of the end walls and strips.

5. A baking pan comprising a bottom, angularly disposed side walls, independently formed end walls interposed between the ends of said side walls, strips integral with the top edges of the end walls of the pan and lying substantially flush against the outer faces of said end walls and having their end edges adjacent the end edges of said side walls, and seams permanently joining the adjoining edges of the side walls, end walls, strips and bottom.

6. In a baking pan set the combination with a plurality of individual pans, each having angularly disposed side and end walls, of a strap securing said pans in fixed relative positions, and strips integral with the top edges of a pair of opposed walls of said pans and secured at their end edges to the exterior end edges of the other walls and to which the strap may be attached.

7. In a baking pan set the combination with a plurality of individual pans, each having angularly disposed side and end walls, of a strap securing said pans in fixed relative positions, strips integral with the top edges of a pair of opposed walls of said pans and having their end edges positioned adjacent the exterior end edges of the other walls, an interseamed connection between the adjacent ends of said strips and said other walls, said strips providing means to which the strap may be attached.

8. In a baking pan set the combination with a plurality of individual pans, of a strap securing said pans in fixed relative positions, and strips integral with the top edges of the end walls of the pans, and secured at their ends to the exterior side edges of said end walls and to which the strap may be attached.

9. In a baking pan set the combination with a plurality of individual pans, of a strap securing said pans in fixed relative positions, and strips integral with the top edges of the end walls of the pans, lying substantially flush against the outer faces of said end walls and secured at their ends to the side edges thereof, to which said strap may be permanently attached.

JACOB KOLLMAN.